F. C. SCHMID & C. F. DEWEY.
PHOTOGRAPHIC CAMERA SHUTTER.
APPLICATION FILED MAY 14, 1909.

975,464.

Patented Nov. 15, 1910.

6 SHEETS—SHEET 1.

Witnesses:
L. F. Browning
John Darby

Inventors
Frederick C. Schmid
Charles F. Dewey
By their Attorney
Edward C. Davidson F. C. SCHMID & C. F. DEWEY.
PHOTOGRAPHIC CAMERA SHUTTER.
APPLICATION FILED MAY 14, 1909.

975,464.

Patented Nov. 15, 1910.

6 SHEETS—SHEET 2.

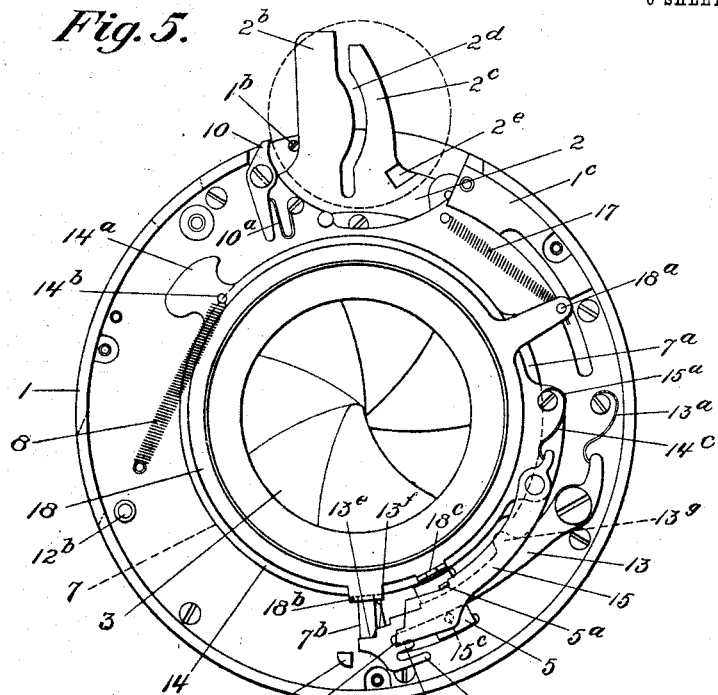

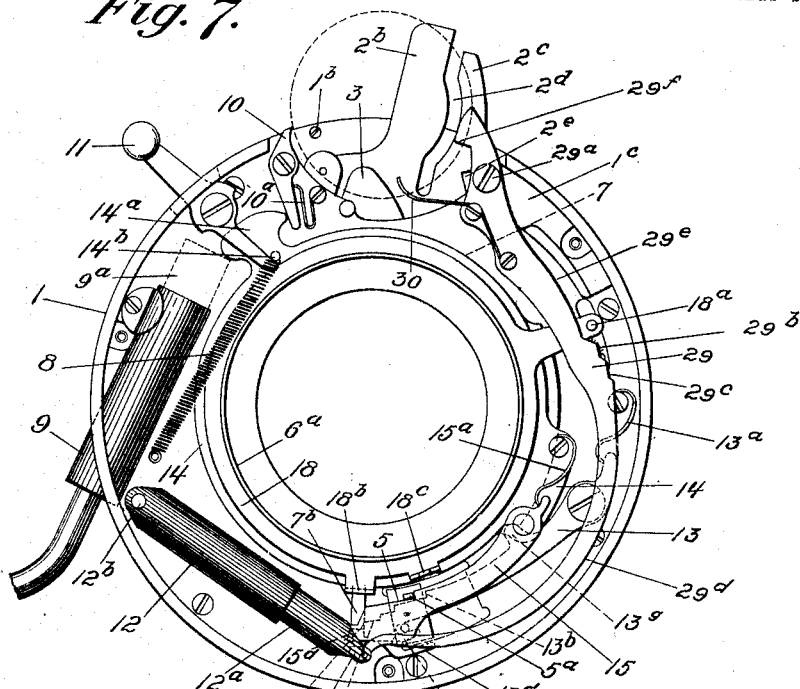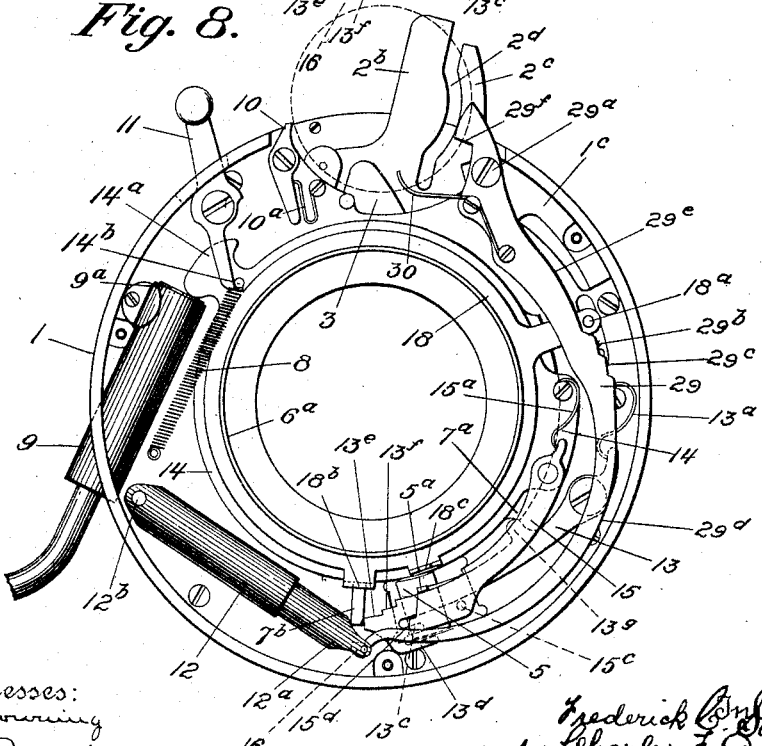

F. C. SCHMID & C. F. DEWEY.
PHOTOGRAPHIC CAMERA SHUTTER.
APPLICATION FILED MAY 14, 1909.

975,464.

Patented Nov. 15, 1910.

6 SHEETS—SHEET 5.

Witnesses:
L. J. Browning
John Darby

Inventors
Frederick C. Schmid
Charles F. Dewey
By their Attorney
Edward C. Davidson F. C. SCHMID & C. F. DEWEY.
PHOTOGRAPHIC CAMERA SHUTTER.
APPLICATION FILED MAY 14, 1909.

975,464.

Patented Nov. 15, 1910.
6 SHEETS—SHEET 6.

Witnesses:
L. J. Banning
John Darby

Inventors
Frederick C. Schmid
Charles F. Dewey
By their Attorney
Edward C. Davidson

UNITED STATES PATENT OFFICE.

FREDERICK C. SCHMID AND CHARLES F. DEWEY, OF NEW YORK, N. Y., ASSIGNORS TO C. P. GOERZ AMERICAN OPTICAL COMPANY, OF NEW YORK, N. Y., A CORPORATION OF NEW YORK.

PHOTOGRAPHIC-CAMERA SHUTTER.

975,464.  Specification of Letters Patent.  Patented Nov. 15, 1910.

Application filed May 14, 1909. Serial No. 495,851.

*To all whom it may concern:*

Be it known that we, FREDERICK C. SCHMID and CHARLES F. DEWEY, residing in the borough of the Bronx, city and State of New York, have invented certain Improvements in Photographic-Camera Shutters, of which the following is a specification.

Figure 1:
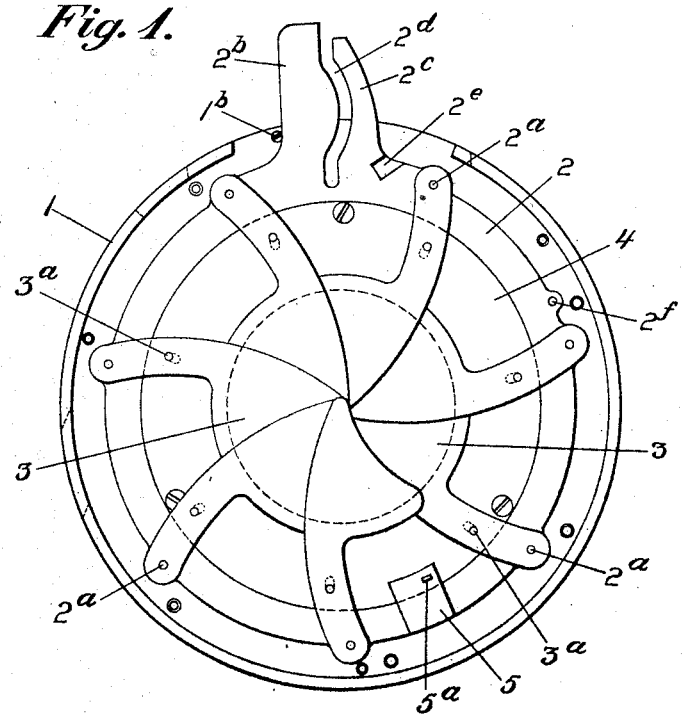
Figure 2:
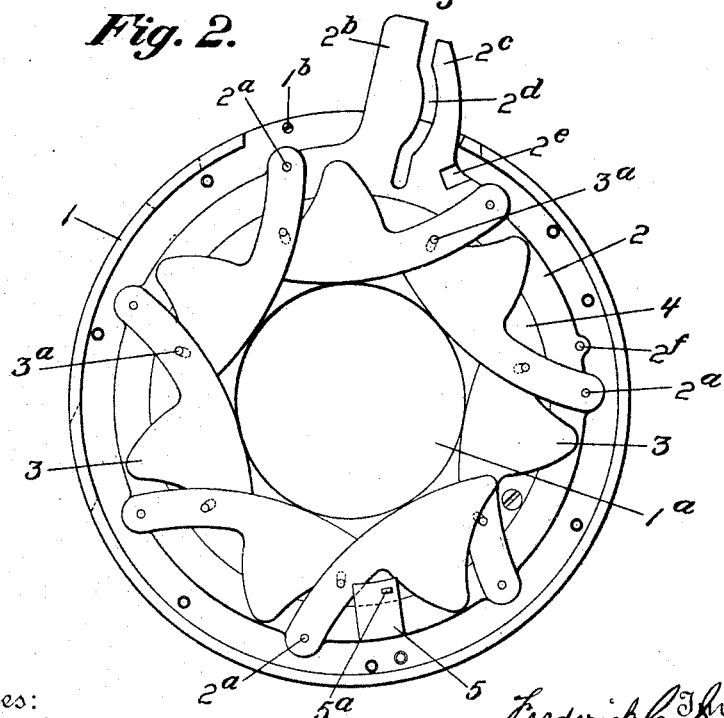
Figure 3:
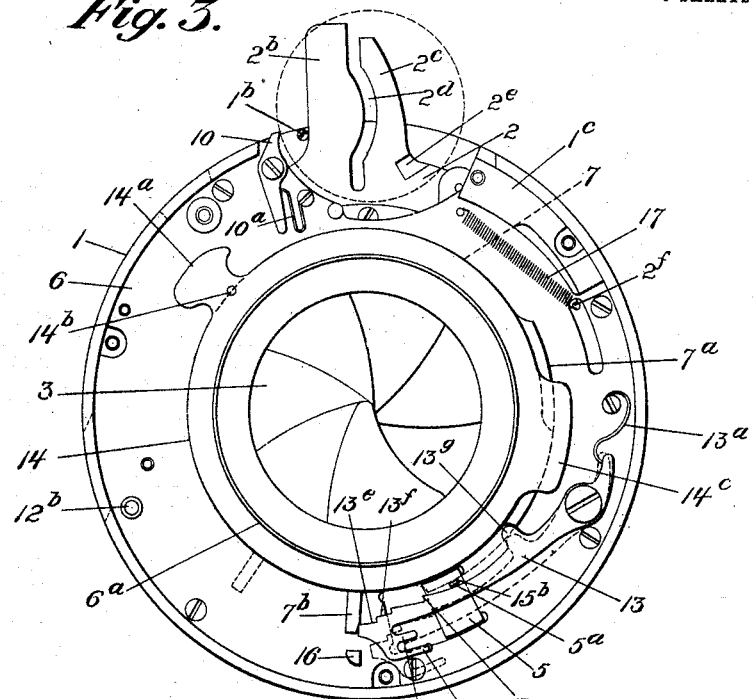
Figure 4:
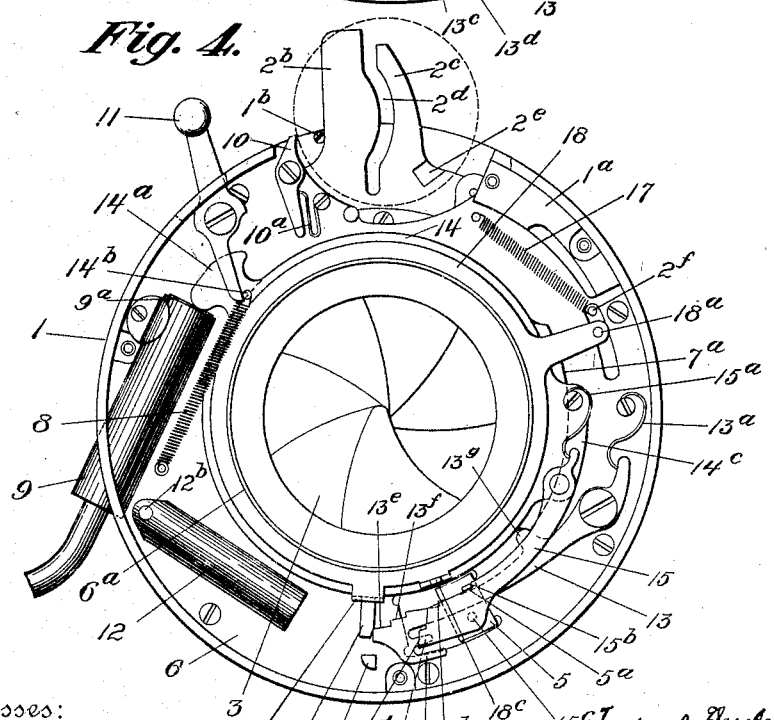
Figure 9:
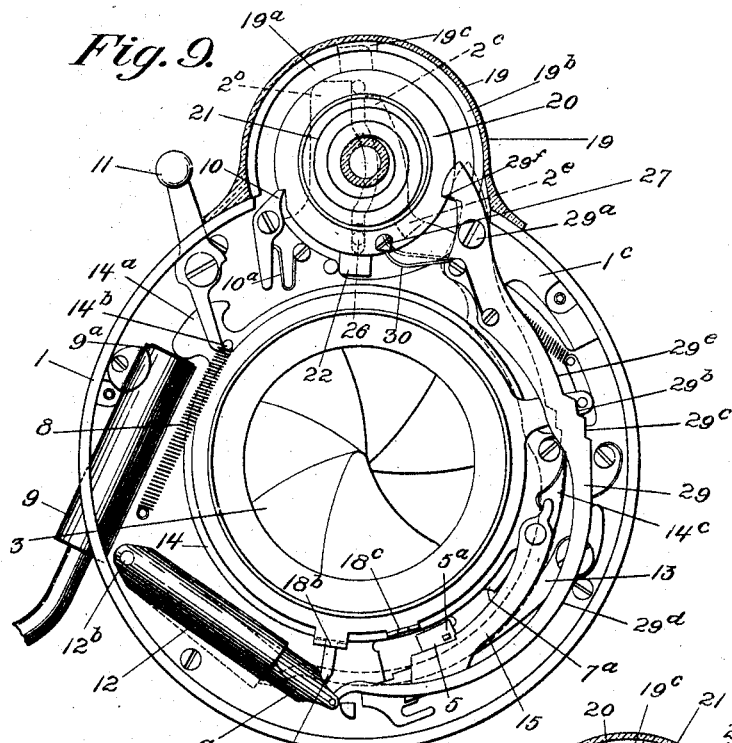
Figure 10:
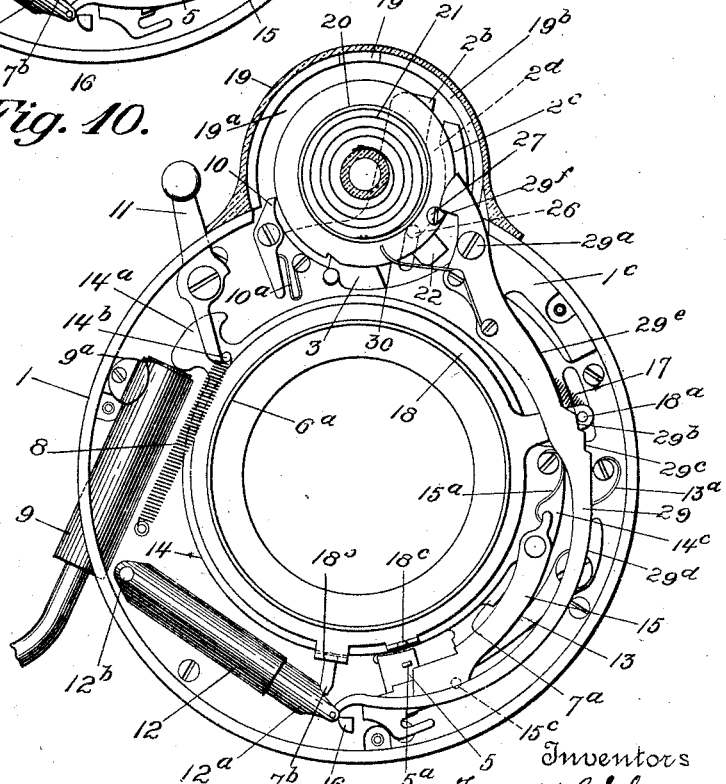
Figure 11:
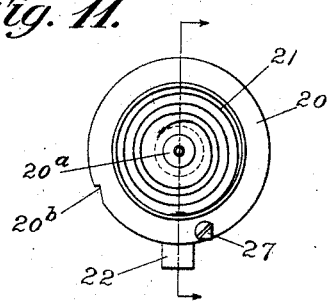
Figure 12:
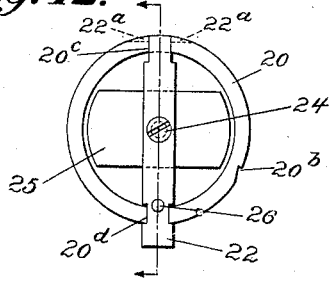
Figure 13:
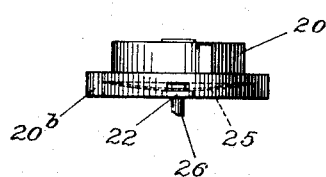
Figure 14:
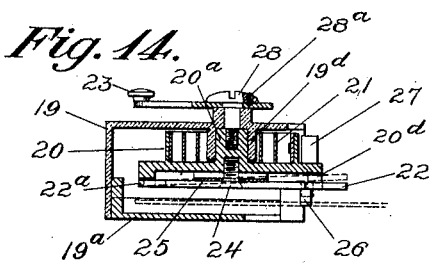
Figure 16:
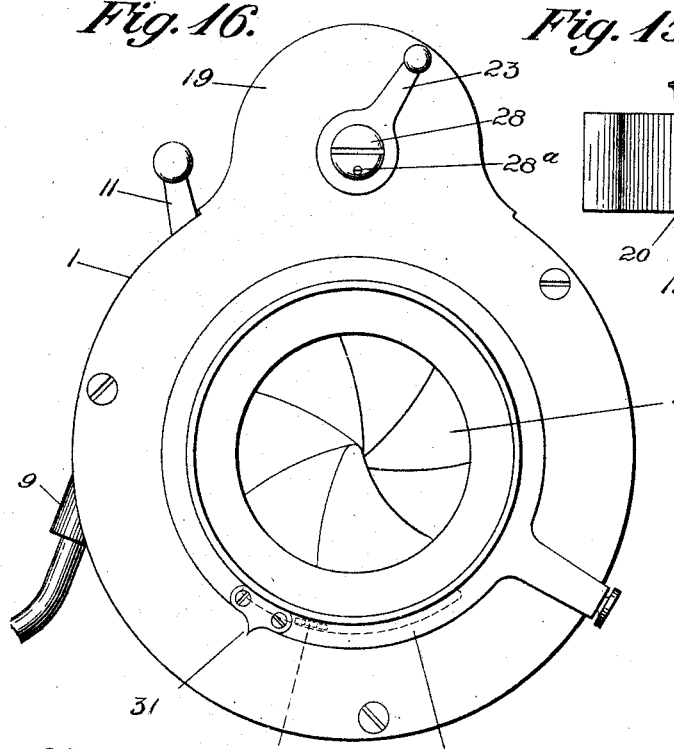
Figure 15:
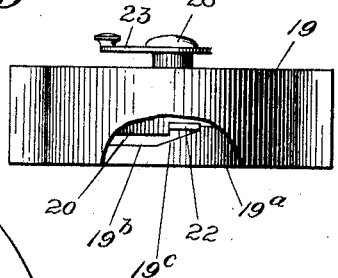

In the accompanying drawings: Figure 1, is a plan view of the shutter with the shutter blades closed and all superimposed parts removed; Fig. 2, a similar view with the shutter blades open; Fig. 3, a plan view of the shutter closed, showing a diaphragm plate covering the blades, a spring for actuating the shutter and lever arms for determining bulb, time and instantaneous exposure; Fig. 4, a similar view showing the actuating bulb pump, finger operating lever, and releasing lever arm, with the lever arms in position for time exposure; Fig. 5, is the same as Fig. 4, with bulb pump and hand operating device removed and the lever arms in position for bulb exposure; Fig. 6, same as Fig. 5 with lever arms in position for instantaneous exposure; Fig. 7, same as Fig. 4, with shutter blades opened by the bulb or hand actuating device and showing the timing lever arm and its dash-pot; Fig. 8, same as Fig. 7 with the bulb pump and hand actuating device in their normal position and the shutter open; Fig. 9, a plan view partly in section showing the shutter closed, a motor spring barrel for automatically regulated time exposures and the lever arms for bulb and hand exposure out of engagement; Fig. 10, same as Fig. 9, with the shutter open; Fig. 11, a top plan view of the motor spring barrel; Fig. 12, a bottom plan view of same; Fig. 13, shows the motor barrel in elevation; Fig. 14, is a section of the motor barrel and housing; Fig. 15, a top elevation of motor barrel housing with part broken away; and Fig. 16, is a plan view of the shutter completely assembled.

The cylindrical case 1, (Fig. 1) is designed with a central exposure opening $1^a$ and a suitable projection (not shown) on its under side for attachment of the lens mount. Fastened to the bottom of the case 1 is a ring 4 on which are pivoted the shutter blades 3 turning on pins $3^a$, and having outwardly extended parts hinged on pins $2^a$ carried by a shutter actuating ring 2, bearing on the bottom of case 1 and on the stationary ring 4 about which it is free to turn. Projecting from the shutter ring 2 are the upwardly extending arms $2^b$ and $2^c$ between whose adjacent edges is a cam slot $2^d$. Attached to ring 2 is a plate 5 projecting inward over the shutter blades and stationary ring 4 and having a pin $5^a$ projecting parallel with the axis of the ring. The ring 2 also carries an upwardly projecting pin $2^f$ to which is attached the shutter closing spring. Mounted in case 1 is a suitable stop pin $1^b$ against which the arm $2^b$ of ring 2 rests when the shutter is closed. By clock-wise rotation of the shutter blade actuating ring 2 to the position shown in Fig. 2, the shutter blades 3 will be moved about their pivotal points $3^a$ to open position; and by its reverse or counter clock-wise rotation the shutter blades 3 will be closed.

Mounted in case 1, Fig. 3, above the shutter blades 3 and shutter ring 2, is a separating diaphragm plate 6 that carries various parts of the shutter actuating mechanism. This plate has an exposure opening corresponding to, and registering with, the opening $1^a$ in shutter case 1, and also an upwardly extending cylindrical portion $6^a$ that serves as a central bearing for a cam ring 7 resting on plate 6 as a base. At one portion of the circumference cam ring 7 has a concentric cam projection $7^a$ and from the lower edge of the ring extends a downwardly projecting finger or stop $7^b$. Pivoted on plate 6 is a finger lever 11 (Fig. 4), its outer end projecting through case 1 and its inner end engaging a pin $14^b$ on the ring 14, superimposed on cam ring 7. One end of a tension spring 8 is attached to pin $14^b$ and the other to a pin in plate 6.

Fixed on plate 6, and having its outer end projecting through case 1, is a bulb pump 9 adapted to be operated by the usual bulb (not shown). Pivotally mounted on pin $12^b$ carried by plate 6, is the timing dash-pot 12. The plate 6 has openings to admit of proper movement of pin $2^f$ and projection $5^a$ on plate 5 carried by shutter ring 2. A cam lever arm 13 pivoted in plate 6 has its longer or camming end normally pressed inward by reaction of a spring $13^a$ applied to its short end. Ring 14 is provided at one portion of its circumference with the projecting plate $14^a$ and at another point with a projection $14^c$. The spring 8 at all times tends to hold one rounded portion of projection $14^a$ against plunger $9^a$ of bulb pump 9. Pivoted on projection 14ᶜ of ring 14 is a cam lever arm 15 overlying the cam arm 13 and having its longer or cam end normally pressed inward by reaction of spring 15ᵃ against its shorter end. Cam lever arm 15 is provided on its inner edge with a notch or shoulder 15ᵇ to engage the pin 5ᵃ. Attached to pin 2ᶠ of shutter ring 2 that projects through plate 6, is a coiled spring 17 tending to normally hold the shutter blades 3 in closed position.

Superimposed on ring 14 is the selecting ring 18 having an outwardly extending arm carrying an upwardly projecting pin 18ᵃ. Ring 18 also has an outwardly and downwardly projecting lip 18ᵇ the lower edge of which is slotted to embrace the finger 7ᵇ of cam ring 7, and any rotative movement of the selecting ring will produce a like movement of ring 7. A third projection 18ᶜ from selecting ring 18 extends upward through the cover plate of the casing (Figs. 6 and 16) and is engaged by the movable visible indicator ring 31. The shutter may be opened for an exposure by either the bulb pump plunger 9ᵃ or finger lever 11 against the tension of springs 17 and 8. In Fig. 3 the cam lever arm 13 is shown by full lines in the first or time position, and by the dotted lines entirely out of operative position. By imparting a clockwise rotation (Fig. 4) to ring 14 by finger lever 11, or bulb pump plunger 9ᵃ, a like movement will be transmitted to the shutter ring 2 by the shoulder 15ᵇ of cam lever arm 15 that will engage pin 5ᵃ, and the shutter will be opened. At the end of such movement lever arm 15 carries pin 5ᵃ slightly past the shoulder 13ᵇ of cam arm 13, which then engages it as lever 15 recedes, arm 13 being moved inward by spring 13ᵃ, and the shutter is held open as shown in Fig. 7. Fig. 8 shows the shutter held open by cam arm 13 and the actuating parts in their retracted or normal positions. Projecting downwardly from cam arm 15 is a pin 15ᶜ designed to engage the fingers 13ᶜ and 13ᵈ of cam arm 13. In the opening movement of the shutter pin 15ᶜ passes into the recess between finger 13ᶜ and the body of cam arm 13, and the nose 15ᵈ of cam arm 15 rides over the camming pin 16, as shown in Fig. 7, the cam arm 13 having moved inwardly when engaging pin 5ᵃ. The second forward movement of cam arm 15, imparted to it by the bulb pump or finger lever 11, brings pin 15ᶜ in contact with the lower portion of the rounded nose of finger 13ᶜ deflecting said pin into the lower slotted recess of cam lever arm 13 and bringing the nose 15ᵈ of cam lever arm 15 in contact with cam pin 16 that cams arm 15 outward and with it cam arm 13, thereby releasing pin 5ᵃ and allowing the shutter to be closed by the action of spring 17, after which cam lever arm 15 is returned to normal position by action of spring 8.

Figs. 3 and 4 illustrate cam lever arms 13 and 15 in proper positions for time exposure. Finger 7ᵇ of ring 7 is in contact with the end of cam arm 13. This latter lever arm is provided with a plurality of steps 13ᵉ and 13ᶠ to which finger 7ᵇ may be rotated by the visible indicator 31, Fig. 16. Fig. 5, shows finger 7ᵇ moved forward to step 13ᵉ of cam arm 13, thereby determining the position of the arm for bulb exposure. Clock-wise or forward movement of arm 15 produced by the bulb pump 9ᵃ or by lever 11 (not shown in Fig. 5) opens the shutter. Pin 15ᶜ moves forward in the upper recess of cam arm 13 and the nose 15ᵈ of arm 15 passes above cam pin 16, and arm 13 is held from moving inwardly to engage pin 5ᵃ by the finger 7ᵇ thus allowing the shutter to close as pressure on the bulb is released, pin 5ᵃ returning with arm 15 through its backward or anti-clockwise movement. The shutter blades 3 may thus be held in their open position so long as pressure is maintained on the pump bulb or on the outer end of lever 11. Fig. 6, shows finger 7ᵇ moved forward to step 13ᶠ of cam arm 13, thereby determining the position of that arm for instantaneous bulb exposure. In the forward movement of arm 15, pin 15ᶜ travels in the upper recess of arm 13 and against the outer edge of said arm, deflecting arm 15 and bringing its nose 15ᵈ against cam pin 16, which acts to disengage arm 15 from pin 5ᵃ thereby allowing the shutter to close while pressure is still maintained on the bulb pump, or on lever 11.

It will thus be seen that the function of the cam lever arms 13 and 15 is to determine time, bulb and instantaneous exposure by the shutter, the first two being dependent on the will of the operator. Means are provided, as described hereinafter, for automatically determining precisely the time of exposure independent of the operator. In bringing into play the automatic timing mechanism, the camming arms 13 and 15 are at the same time thrown into an inoperative position. Referring to Fig. 3, it will be seen that the bottom ring 7 is provided with a concentric cam projection 7ᵃ designed to engage in its forward movement the inwardly extending projection 13ᵍ of cam arm 13. By the forward or lockwise rotation of ring 7, actuated by the visible indicator ring 31 through ring 18, Fig. 16, cam 7ᵃ acts against projection 13ᵍ of arm 13, forcing it outwardly to the position shown in Fig. 9. The outward movement of cam arm 13 carries with it cam arm 15 through the action of 13 on pin 15ᶜ of arm 15, both of said arms assuming the inoperative position shown in Figs. 9 and 10. On the upper side of the case 1, Figs. 9, 10, and 16, is a cylindrical housing 19 provided with a rotatively mounted motor barrel 20 (Figs. 11, 12, 13 and 14), composed of an upwardly extending cylinder carrying the motor spring 21 and a larger downwardly projecting shallow cylinder in which is mounted the shutter actuating arm 22. In the section, Fig. 14, is shown the method of mounting the motor barrel in the housing 19. From the under face of the upper side of housing 19, a downwardly projecting cylinder 19$^d$ forms a bearing for the upwardly extending cylinder 20$^a$ of motor barrel 20. Motor barrel 20 is held in position relative to housing 19 by the shouldered screw 28, and the actuating crank arm 23, for setting the motor barrel, may be made rigid with screw 28 by any suitable means, such as the small set screw 28$^a$, or the shoulder next the head of the screw may be square and the opening in the crank arm correspondingly shaped.

To the downwardly projecting cylinder 19$^d$ is fastened the inner end of the coiled motor spring 21, the outer end of which is held by a pin on the inner side of spring barrel 20 in the usual manner. The downwardly projecting cylinder of motor barrel 20 (Fig. 9) is provided with a notched recess 20$^b$, at a suitable point in its periphery, engaged by a latch 10 that holds the motor barrel in its set position against the tension of spring 21. In the under edge of the lower portion of the motor barrel are two diametrically opposite slots 20$^c$ and 20$^d$, for the mounting of the shutter actuating arm 22, Figs. 12 and 14. Slot 20$^c$ is but slightly deeper than the thickness of arm 22. Transversely to the slot 20$^c$ in the outer circumference of the motor barrel 20 are provided two recessed grooves into which the pivot projections 22$^a$ carried at one end of bar 22 fit, forming a hinge joint for said bar, Fig. 12. The slot 20$^d$ is cut the full depth of the lower cylinder wall to permit of an upward movement of the bar 22. Except at the slots 20$^c$ and 20$^d$ the shutter actuating bar 22, Figs. 12 and 14, is wider than the slots. Plate 19$^a$, forming the bottom of the motor barrel housing, has an upwardly extending flange or edge conforming to the inner circumference of the housing wall 19. The portion 19$^b$ of said edge lies parallel with and below the plane of travel of the extended end of actuating arm 22 and the part 19$^c$ is inclined upward cutting through the plane of travel of said arm 22, forming a camming surface that lifts the upwardly movable end of arm 22 against the action of spring 25, thus raising pin 26 out of cam slot 2$^d$ and above the upper faces of cam arms 2$^b$ and 2$^c$ of the shutter closing ring 2 when the motor device is not in operation. Arm 22 (Figs. 15 and 19) is shown at the end of its travel and in its raised position on cam edge 19$^c$. In this position the shutter ring 2 is free to move and may be actuated by the plunger 9$^a$ of bulb pump 9 or by the finger lever 11 independent of the motor barrel. In Figs. 3, 4, 5, 6, 7, and 8 the position of the motor barrel is shown by dotted circles. In Figs. 9 and 10 the motor barrel is shown in upper plan view and the housing in section.

Pivotally mounted near its upper end on block 1$^c$ by means of screw 29$^a$ is the time lever 29, its lower extremity being pivotally connected to the outer end of plunger 12$^a$ of the time dash-pot 12. In the upper end of lever 29 beyond the pivot point, is a recessed cam face 29$^f$ designed to be engaged by cam pin 27 on the rotative barrel of the motor device, and to the same end of the lever is attached a spring 30, the free end of which lies in the path of travel of the cam pin 27. The outer edge of the time lever 29 lies in the circular path of travel of pin 18$^a$ of ring 18 and is designed to be acted upon by said pin to determine the amount of travel of plunger 12$^a$ of time dash-pot 12. That edge of the time lever designated by 29$^e$ lies below the arc of travel of pin 18$^a$ and is not influenced by it in its movement corresponding to the positions of activity of cam arms 13 and 15 hereinbefore described. That portion of the lever 29 that may be acted upon by pin 18$^a$ is divided into a plurality of steps 29$^b$, 29$^c$, and a gradually outwardly increasing cam edge 29$^d$.

By clock-wise or forward movement of pin 18$^a$ in contact with the outer camming edge of lever 29, the plunger 12$^a$ will be forced into the dash-pot cylinder 12 a gradually increasing distance until the limit of inward travel is reached. The extreme inward position of time dash-pot plunger 12$^a$ and corresponding position of time lever 29 is shown by dotted lines in Fig. 9. The time dash-pot is of ordinary construction having a cylinder 12 pivotally mounted at one end on pin 12$^b$ and also a closely fitting plunger or piston 12$^a$ the outer end of which is pinned to the end of time lever 29. If, for example, the plunger 12$^a$ when in its extreme outward position, as shown in Figs. 7 and 8, requires, under a given inward pressure imparted by the lever 29, one second to travel to its extreme inward position against the gradually escaping air contained in the cylinder 12, it is evident that half the travel of the plunger against the escaping air will be accomplished in materially less time. By adjustment of the visible indicator 31, Fig. 16, pin 18$^a$ may be set to limit outward movement of lever 29, and hence determines to fractions of a second the time required to force the plunger 12$^a$ to its extreme inward position.

Tension is imparted to the motor spring 21 by the clockwise rotation of crank arm 23. In Fig. 9 the motor barrel is shown in its set position and is held against the tension of its spring 21 by the pawl 10; and pin 26 of the actuating arm 22 is engaged by the lower straight portion of cam slot 2ᵈ of the shutter closing ring 2. By forward movement of the bulb pump plunger or of the inner end of the finger lever 11, projection 14ᵃ on ring 14 is brought in contact with the downwardly projecting arm of pawl 10, disengaging its upper end from notch 20ᵇ of motor barrel 20 and permitting spring 21 to set in anti-clockwise rotation the motor barrel 20. Pin 26 in its anti-clockwise movement acts against the inner edge of cam arm 2ᶜ of shutter ring 2 and opens the shutter, at which point the motor barrel is in the position shown in Fig. 10, and cam pin 27 comes in contact with cam face 29ᶠ of time lever 29 when pin 26 is at the lower point of the concentric portion of cam slot 2ᵈ. In the open position of shutter ring 2, the curved portion of cam slot 2ᵈ coincides with the path of travel of pin 26 and the shutter will remain open during the transit of said pin in said portion of the cam slot, during which upward pressure of cam pin 27 exerted by motor spring 21 against cam face 29ᶠ of time lever 29, forces outwardly the upper end of the lever against the retarding action of time dash-pot 12. At the instant the plunger 12ᵃ reaches its extreme inner position, cam pin 27 is released from the upper end of time lever 29 and the shutter remains open until pin 26 coming in contact with the upper straight portion of cam arm 2ᵇ closes it, being aided by spring 17.

In setting the motor barrel 20 to operate the shutter, the pin 26 in its clock-wise rotation passes beyond the outer end of cam arm 2ᶜ of shutter actuating ring 2; the outer end of arm 22 slides down the cam surface 19ᶜ and assumes its normal position in the motor barrel 20; the beveled edge of pin 26 comes in contact with the inclined slot 2ᵉ of cam arm 2ᶜ and lifts the arm 22 holding it upward until pin 26 drops into the lower end of cam slot 2ᵈ as shown by dotted lines, Fig. 9. After the closing of the shutter by the motor barrel, the time dash-pot plunger 12ᵃ remains in its inner position shown by dotted lines Fig. 9, until the time lever 29 is reset by the cam pin 27 coming in contact with spring 30 carried on the lever being thus forced outward until stopped by contact with pin 18ᵃ.

By proper graduation of the upper face of case 1 in the arc of travel of the visible indicator 31 the latter may be adjusted so that the time lever arm 29 may be set for any desired period of exposure within its limits, or the motor barrel may be made inoperative and the shutter be capable of actuation directly from the bulb pump or finger lever for time, bulb or instantaneous exposure.

We claim:

1. A photographic camera shutter comprising shutter blades, their actuating ring provided with a cam-way the intermediate portion of which is substantially concentric to a center and the outer portions extended away therefrom, and a motor device turning about said center and having a part that travels through the cam-way, whereby the first effect of the motor device part in an outer portion of said cam-way is to move the ring to open the shutter, which remains open while the part of the motor device is traversing the concentric portion of the cam-way, and the final effect is to close the shutter.

2. A photographic camera shutter comprising shutter blades, their actuating ring provided with a cam-way the intermediate portion of which is substantially concentric to a center and the outer portions extended away therefrom, a motor device turning about said center and having a part that travels through the cam-way, whereby the first effect of the motor device part in an outer portion of said cam-way is to move the ring to open the shutter, which remains open while the part of the motor device is traversing the concentric portion of the cam-way, and the final effect is to close the shutter, and means acting automatically to disengage the motor part from the final portion of the cam-way when the movement of the ring is completed so that the shutter may be operated by means other than the motor device.

3. A photographic camera shutter comprising shutter blades, their actuating ring provided with a cam-way the intermediate portion of which is substantially concentric to a center and the outer portions extended away therefrom, a motor device turning about said center and having a part that travels through the cam-way, whereby the first effect of the motor device part in an outer portion of said cam-way is to move the ring to open the shutter, which remains open while the part of the motor device is traversing the concentric portion of the cam-way, and the final effect is to close the shutter, and means for resetting the motor device for another motor actuated exposure operation of the shutter.

4. A photographic camera shutter comprising shutter blades, their actuating ring provided with a cam-way the intermediate portion of which is substantially concentric to a center and the outer portions extended away therefrom, a motor device turning about said center and having a part that travels through the cam-way, whereby the first effect of the motor device part in an outer portion of said cam-way is to move the ring to open the shutter, which remains open while the part of the motor device is traversing the concentric portion of the cam-way, and the final effect is to close the shutter, means for disengaging the motor part from the final portion of the cam-way when the movement of the ring is completed and adjustable means for automatically determining the time of exposure (or shutter opening) so effected.

5. A photographic camera shutter comprising shutter blades, their actuating ring provided with a cam-way the intermediate portion of which is substantially concentric to a center and the outer portions extended away therefrom, a motor device turning about said center and having a part that travels through the cam-way, whereby the first effect of the motor device part in an outer portion of said cam-way is to move the ring to open the shutter, which remains open while the part of the motor device is traversing the concentric portion of the cam-way, and the final effect is to close the shutter, an adjustable time exposure lever, a dash-pot to the piston of which one end of the lever is connected and a cam-piece carried by the motor device that operates upon the other end of the lever while said part of the motor is traversing the concentric part of the cam-way.

6. A photographic camera shutter comprising shutter blades, their actuating ring provided with a cam-way the intermediate portion of which is substantially concentric to a center and the outer portions extended away therefrom, a motor device turning about said center and having an elastic or yielding arm with a pin that travels through the cam-way, whereby the first effect of the motor device is to move the ring to open the shutter, which remains open while the pin of the motor device is traversing the concentric portion of the cam-way, and the final effect is to close the shutter, and a cam acting on the elastic arm to disengage the pin from the ring when the movement of the latter is completed.

7. A photographic camera shutter comprising shutter blades, their actuating ring provided with a cam-way the intermediate portion of which is substantially concentric to a center and the outer portions extended away therefrom, a motor device turning about said center and having a part that travels through the cam-way, whereby the first effect of the motor device is to move the ring to open the shutter, which remains open while the part of the motor device is traversing the concentric portion of the cam-way, and the final effect is to close the shutter, an adjustable time exposure lever, a dash-pot to the piston of which one end of the lever is connected and a cam-piece carried by the motor device that operates upon the other end of the lever while said part of the motor is traversing the concentric part of the cam-way, and cam devices comprising a circularly movable pin acting upon a cam face on the lever to adjust the position of the dash-pot piston.

8. A photographic shutter comprising shutter blades, their actuating ring provided with a projection $5^a$ parallel with its axis, a second rotative ring 7 having a projection $7^b$, a third rotative ring 14 adapted to be operated by either a bulb pump or finger lever, a spring pressed lever 13 pivoted on a fixed axis and having a shoulder to engage projection $5^a$ to hold the shutter open and two steps adapted to be engaged by projection $7^b$, a spring pressed lever 15 pivoted on ring 14 and having a shoulder to engage projection $5^a$ and carry it, when ring 14 is first actuated, into engagement with the shoulder on lever 13, cam means which upon the second actuation (following the return of ring 14 to normal position) of ring 14 act to disengage lever 13 from projection $5^a$ to permit the blade actuating ring to return to normal position closing the shutter blades; means accessible at the outside for moving ring 7 to bring projection $7^b$ into engagement with the lower one of said two steps on lever 13 to prevent said lever from engaging projection $5^a$ thereby effecting closing of the shutter blades as their actuating ring returns to normal position, or into engagement with the higher of said steps and cam means acting in the latter event to automatically disengage lever 15 from projection $5^a$ during the forward movement of the former thereby effecting instantaneous exposure.

9. A photographic camera shutter comprising shutter blades and means for effecting bulb, time and instantaneous exposures, a rotative ring 7 having a projection $7^b$ controlling such exposure means and a cam projection for throwing said means out of operation, a second ring interlocked with ring 7 for co-incident rotation and having a projection connected with an adjusting device outside the apparatus, an adjustable automatically-timed exposure mechanism brought into operation when said rings are rotated to throw said means out of operation.

10. A photographic camera shutter comprising shutter blades and means for effecting bulb, time and instantaneous exposures, a rotative ring 7 having a projection $7^b$ controlling such exposure means and a cam projection for throwing said means out of operation, a second ring interlocked with ring 7 for co-incident rotation and having a projection connected with an adjusting device outside the apparatus, an adjustable automatically-timed exposure mechanism brought into operation when said rings are rotated to throw said means out of operation and means whereby said mechanism is adjusted for different automatically timed periods of exposure by the rotation of said rings.

11. A photographic camera shutter, comprising the combination of shutter blades, their actuating ring having projection $5^a$, a spring pressed lever 13, having a shoulder for engagement with projection $5^a$ and stepped surfaces of different elevation, pivoted upon a fixed axis, a second rotative ring 14, a spring pressed lever 15 pivoted on ring 14 and having a shoulder for engagement with projection $5^a$ and a third rotative ring 7 having a projection $7^b$ adapted to be moved into engagement with either of the stepped surfaces of lever 13, for the purpose set forth.

In testimony whereof, we have hereunto subscribed our names.

FREDERICK C. SCHMID.
CHARLES F. DEWEY.

Witnesses:
FRANK J. HOLLER,
AUGUST STOECKICH.